(12) United States Patent
Norcott

(10) Patent No.: US 7,657,576 B1
(45) Date of Patent: Feb. 2, 2010

(54) ASYNCHRONOUS CHANGE CAPTURE FOR DATA WAREHOUSING

(75) Inventor: William D. Norcott, Nashua, NH (US)

(73) Assignee: Oracle International Corporation, Redwood Shores, CA (US)

(*) Notice: Subject to any disclaimer, the term of this patent is extended or adjusted under 35 U.S.C. 154(b) by 558 days.

(21) Appl. No.: 09/863,419

(22) Filed: May 24, 2001

(51) Int. Cl.
G06F 12/00 (2006.01)
G06F 17/30 (2006.01)

(52) U.S. Cl. .................. 707/202; 707/2; 707/3; 707/100; 707/204

(58) Field of Classification Search ........... 707/1–10, 707/100–104.1, 200–205; 705/26; 700/108; 711/112, 202
See application file for complete search history.

(56) References Cited

U.S. PATENT DOCUMENTS

| 5,280,612 | A | | 1/1994 | Lorie et al. |
| 5,553,279 | A | * | 9/1996 | Goldring ............... 707/201 |
| 5,640,561 | A | * | 6/1997 | Satoh et al. .............. 707/202 |
| 5,848,405 | A | * | 12/1998 | Norcott ................... 707/1 |
| 5,926,819 | A | | 7/1999 | Doo et al. |
| 5,963,959 | A | | 10/1999 | Sun et al. |
| 6,009,432 | A | * | 12/1999 | Tarin ..................... 707/10 |
| 6,125,360 | A | | 9/2000 | Witkowski et al. |
| 6,161,103 | A | * | 12/2000 | Rauer et al. ............... 707/4 |
| 6,205,451 | B1 | * | 3/2001 | Norcott et al. ............ 707/204 |
| 6,438,538 | B1 | * | 8/2002 | Goldring ................. 707/3 |
| 6,567,823 | B1 | * | 5/2003 | Rothschild ............ 707/104.1 |
| 6,594,676 | B1 | * | 7/2003 | Moore ................... 707/202 |
| 6,687,560 | B2 | * | 2/2004 | Kiser et al. .............. 700/108 |
| 2003/0225798 | A1 | * | 12/2003 | Norcott .................. 707/203 |
| 2004/0030703 | A1 | * | 2/2004 | Bourbonnais et al. ....... 707/100 |
| 2005/0193024 | A1 | * | 9/2005 | Beyer et al. .............. 707/200 |

FOREIGN PATENT DOCUMENTS

WO WO/02/095632 A2 11/2002
WO WO/03/096227 A2 11/2003

OTHER PUBLICATIONS

Bello R G et al; "Materialized views in Oracle"; Proceedings of the Twenty-Fourth International Conference on Very-Large Databases; New York, NY; Aug. 24-27,1998; pp. 659-664; Kaufmann Publishers Inc; USA.
Chaudhuri S et al: "An Overview of Data Warehousing and OLAP Technology"; Mar. 1997; pp. 65- 74; vol. 26, No. 1; Sigmod Record; New York, NY; USA.

* cited by examiner

*Primary Examiner*—Hosain T Alam
*Assistant Examiner*—Usmaan Saeed
(74) *Attorney, Agent, or Firm*—Hanify & King, P.C.

(57) ABSTRACT

A method and software for change data capture are disclosed, in which change data is extracted from a recovery log and stored in a database object. The change data indicates what modification has been performed to a source object on the OLTP system. In some embodiments of the present invention, a database statement may be generated and executed to extract and load the change data, and the recovery log itself may be shipped from an OLTP system to a staging system.

7 Claims, 4 Drawing Sheets

ASYNCHRONOUS CHANGE CAPTURE FOR DATA WAREHOUSING

RELATED APPLICATIONS

The present application is related to U.S. patent application Ser. No. 10/140,818 entitled "Method and Apparatus for Change Data Capture in a Database System" filed on May 9, 2002 by William D. Norcott et al.

The present application is related to U.S. patent application Ser. No. 09/863,422 entitled "Synchronous Change Data Capture in a Relational Database" filed on May 24, 2001 by William D. Norcott, the contents of which are hereby incorporated by reference.

FIELD OF THE INVENTION

The present invention relates to database systems and more particularly to asynchronous change capture for data warehousing.

BACKGROUND OF THE INVENTION

Many businesses and other large organizations today use relational database management systems known as on-line transaction processing (OLTP) systems to execute and keep track of business transactions. For example, a company that sells products or services over the Internet may use an OLTP system to record pricing information about each product for sale, billing and shipping information for each purchaser, and sales information for each order made by a purchaser. Other examples of businesses that use OLTP systems include airlines, banks, mail-order companies, supermarkets, and manufacturers.

The data generated and recorded in OLTP systems are valuable to most businesses, because the businesses can aggregate and analyze the data to ascertain the product sales for a particular month, forecast changing trends in product popularity and identify profitable or unprofitable product lines, or otherwise evaluate the businesses' affairs. Aggregating and analyzing this data, however, is computationally expensive and, if performed on the OLTP system itself, would decrease the performance of the OLTP system. Accordingly, it has become common for businesses with OLTP systems to set up a separate computer system, generally known as a "data warehouse," for the purpose of collecting, aggregating, and analyzing the information contained in the OLTP databases. Data warehouses can grow very large, ranging from gigabytes to many terabytes of data (trillions of bytes). The task of moving data from its original source in OLTP systems to the data warehouse is commonly referred to as data extraction, transport, and loading (ETL).

Conventional data extraction, transport, and loading mechanisms are cumbersome. In a typical approach, database administrators generally dump the entire contents of the tables in the OLTP system into flat files, transport the flat files to a staging system, and then load the data in the flat files into the data warehouse. In this approach, the amount of data extracted, transported, and loaded is as immense as the amount of data in the OLTP system, even though only a small percentage of the data on the OLTP system is actually new. Accordingly, there has been much interest in devising ways to reduce the amount of data extracted, transported, and loaded by capturing only the changed data to the database tables of the OLTP system.

A typical approach for capturing the changed data of OLTP system database tables is to add a column to the OLTP system database tables to store a timestamp or a sequence number and conditionally extract the data that has the newest timestamps or sequence numbers. Thus approach has several disadvantages. First, this approach requires a change to the schema, e.g. adding the extra column to hold the timestamp to track the changes. Not only is this schema change an administrative nightmare, but many vendors of OLTP systems forbid their customers from making any change to the schema for security, maintenance, and liability reasons.

Second, there is a performance penalty in storing the timestamp for every row of new or changed data, yet performance is critical for OLTP systems. Third, while timestamps can easily identify which rows have changed due to an insert or update, timestamps cannot distinguish between a newly inserted row or an old row that was updated. Furthermore, timestamps cannot identify deleted rows, because deleted rows are no longer present in the database. The lack of this kind of change information makes it difficult to properly update summaries of the OLTP data, resulting in expensive recalculations of the summary data.

Another approach to capturing changed data is known as "synchronous change data capture," in which the changes are captured in the very same transaction that is updating the tables on the OLTP system. Thus, as new data arrives in the data warehouse, the changes made to one or more tables on the OLTP system are captured synchronously and stored in corresponding change tables in the data warehouse, such that for every table that is updated on the OLTP system, there is a corresponding change table that contains those changes.

Conventional systems have used triggers for synchronous change data capture, either by using the CREATE TRIGGER statement or by using an internal mechanism with equivalent functionality. A trigger is an object that specifies a series of actions to be automatically performed when a specific event occurs, and, according to industry standards, the events that cause triggers to be activated (or "fired") are Data Manipulation Language (DML) statements. For synchronous change data capture, triggers have been designed to fire when a row of a database table is updated, inserted, or deleted. Each of these modifications is associated with its own system change number (SCN), which is recorded by the trigger.

Trigger-based change data capture has two disadvantages for many data warehousing deployments. The first disadvantage is performance. Because triggers are fired every time a row is updated, inserted, or deleted on the OLTP system, triggers impose a performance penalty on every operation performed on the OLTP system. The overhead for trigger processing can be substantial, requiring as much as three times the amount of computing resources to process the same number of operations without triggers. The second disadvantage is that the creation of a trigger is still technically a schema change and therefore forbidden by many turn-key OLTP systems.

Therefore, there is a need for a high-performance technique of data extraction from OLTP systems. There is also need for a data extraction mechanism that does not require schema changes, either in source tables of the OLTP system or by creating triggers.

SUMMARY OF THE INVENTION

These and other needs are addressed by the present invention by extracting the change data from the recovery logs generated by the OLTP system. During the normal course of operation, database management systems maintain a recovery log to allow users to undo transactions and to provide for recovery after a system crash. These logs can be shipped to a data warehouse on a separate computer system, where the change data stored in the recovery logs can be extracted without affecting the performance of the OLTP system.

Accordingly, one aspect of the present invention involves a method and software for change data capture, in which change data is extracted from a recovery log and stored in a database object such as a change table. The change data stored in the database object indicates what modification has been performed to a source object on the OLTP system. In various embodiments of the present invention, a database statement may be generated and executed to extract and load the change data. The recovery log itself may be shipped from an OLTP system to a staging system.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for change data capture are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

ARCHITECTURAL OVERVIEW

Figure 1:
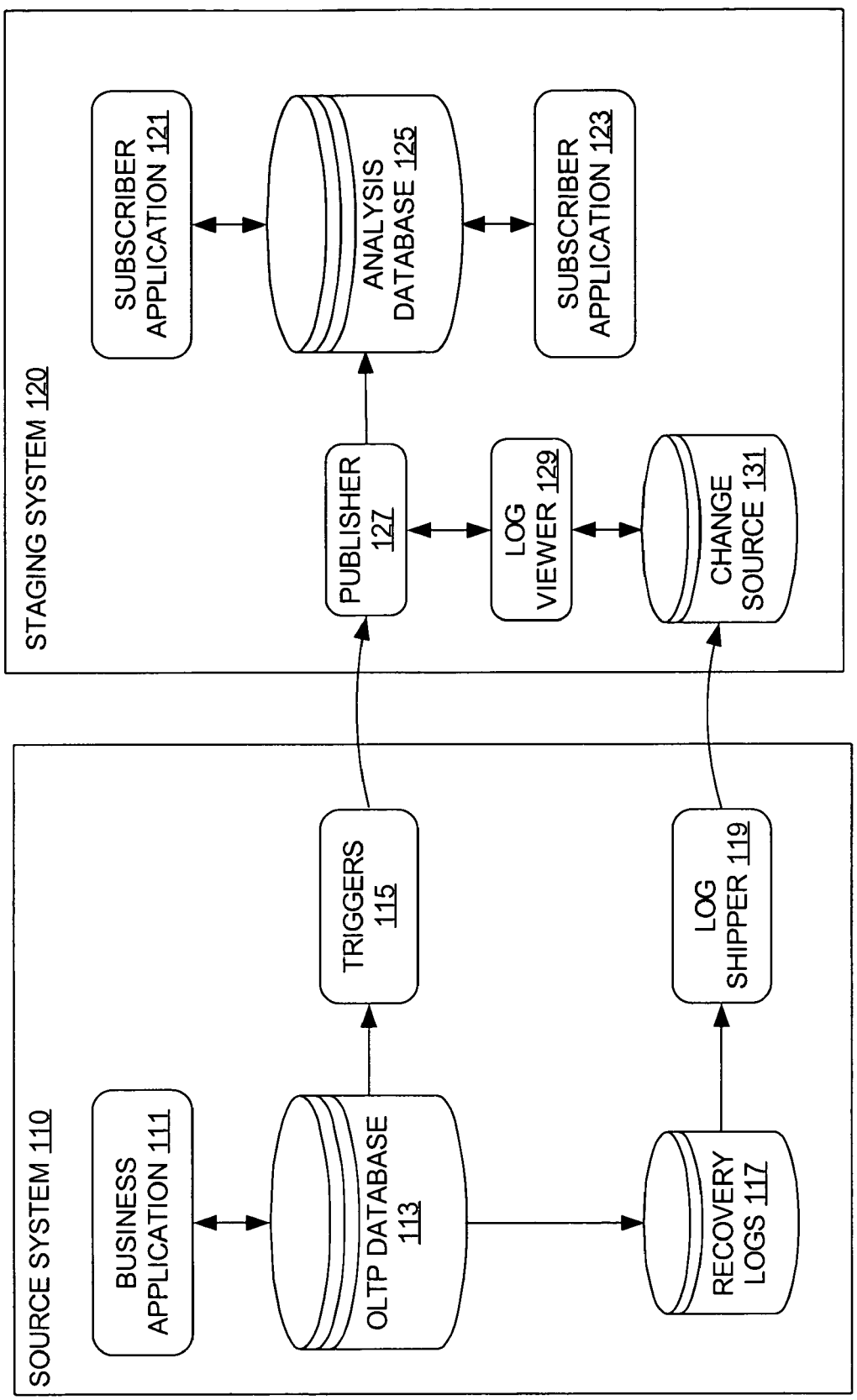
FIG. 1 is a high-level architectural diagram of one embodiment of the present invention.

FIG. 1 depicts the architecture of one embodiment of the present invention comprising a source system 110 and a staging system 120. The source system 110 is typically an on-line transaction processing (OLTP) for executing and keeping track of transactions for a business. For example, the source system 110 hosts a business application 111 that is responsible for interacting with employees or customers of the business. In response to commands and queries from the user of the business application 111, the business application 111 interacts with an OLTP database 113 for storing and retrieving data.

Functioning as the data warehouse in this example, the staging system 120 hosts one or more subscriber applications 121, 123. Without loss of generality, two subscriber applications 121, 123 are depicted, although any number may be created during the course of operation of an embodiment of the present invention. The subscriber applications 121, 123 are responsible for aggregating and analyzing the change data that has been extracted from the OLTP database 113, transported to the staging system 120, and loaded into the analysis database 125. Preferably, one of two mechanisms are employed to extract data from the OLTP database 113 without using flat files. These mechanisms are termed "synchronous extraction" and "asynchronous extraction," respectively.

In the synchronous extraction mechanism, triggers 115 are employed to capture each change to the OLTP database 113 when the changes are made and transport the changes to the staging system 120. At the staging system 120, these changes are then integrated and loaded into change tables (not shown) of the analysis database 125 by a publisher process 127. The synchronous extraction mechanism is described in greater detail in the commonly assigned, co-pending U.S. patent application Ser. No. 09/863,422 entitled "Synchronous Change Data Capture in a Relational Database" filed on May 24, 2001 by William D. Norcott, the contents of which are hereby incorporated by reference.

For the asynchronous extraction mechanism, which is described in greater detail herein below, a log shipper 119 periodically copies recovery logs 117 that are produced by the OLTP database 113 in the normal course of operation. The recovery logs 117 contain all the changes that have been applied to the OLTP database 113 and are used for backing up the data in the OLTP database 113 and restoring the data in case of a system crash. The log shipper 119 copies the recovery logs 117 to an area of the staging system 120 called a change source 131, which can be implemented as an operating system directory. The publisher 127 interacts with a log viewer process 129 to obtain the change data from the shipped recovery logs in the change source 129 without having to be aware of the internal implementation details of the recovery logs. The publisher 127 then loads the change data obtained via the log viewer process 129 into the change tables in the analysis database 125 for use by the subscriber applications 121, 123.

OBJECTS FOR MANAGING CHANGE DATA

In accordance with one aspect of the present invention, the change data extracted from the OLTP database 113 is maintained not in a flat file but in one or more database objects, referred to herein as "change tables" under control of a database management system, e.g. analysis database 125. Because the database management system provides such features as crash recovery for security and indexing for performance, use of database objects to hold the change data advantageously attains these beneficial features, without additional programming as compared to use of flat files.

Figure 2:
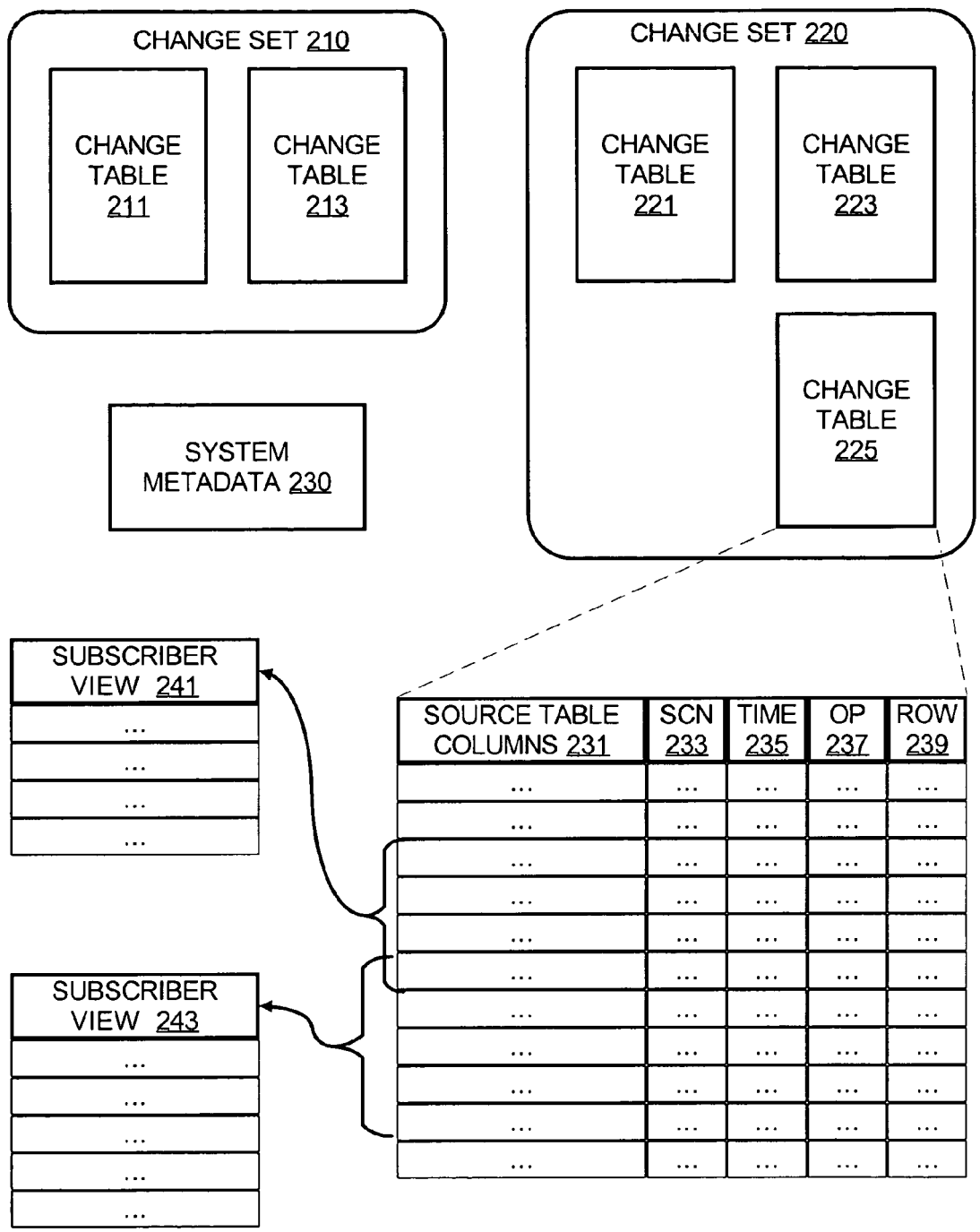
FIG. 2 is a schematic diagram depicting change objects in accordance with one embodiment of the present invention.

Referring to FIG. 2 by way of example, each source table or database object on the OLTP database 113 that is subject to change data capture is associated with a corresponding change table 211, 213, 221, 223, 225 in the analysis database 125. For transactional consistency, change tables 211, 213, 221, 223, 225 are grouped into sets of one or more "change sets" 210, 220 such that the publisher 127 ensures that all new change data added to the change tables in the same change set (e.g. changes tables 211, 213 of change set 210) are added at the same time, e.g. the modifications to these changes tables are performed in the same transaction and committed. In the example depicted in FIG. 2, there are two change sets, change set 210 and change set 220. Change set 210 comprises change table 211 and change table 213, which correspond to respective tables (not shown) on the OLTP database 113. Likewise, change set 220 comprises change table 221, change table 223, and change table 225, which also correspond to respective tables (not shown) on the OLTP database 113. The information that defines the structure of the change sets 210, 220 and change tables 211, 213, 221, 223, 225 is maintained in system metadata 230.

Each change table employs a number of control columns in addition to the source table columns whose values were extracted, transported, and loaded from columns of the corresponding source table in the OLTP database 113. In the example of FIG. 2, change table 225 is depicted as having a set of source table columns 231 and control columns SCN 233, TIME 235, OP 237, and ROW 239. The source table columns 231 may include all or a subset of the columns in the corresponding source table. In various implementations, the control columns may be part of the same database object that contains the source table columns or part of parallel, associated database object, which can be joined with source table columns (e.g. by a row identifier or a primary key).

The control columns SCN 233, TIME 235, OP 237, and ROW 239 preferably have reserved names that customers are not allowed to use for their own columns, for example, names with a reserved character such as a dollar sign ($). The reserved names, of course, can be any valid string and, in this example, are named SCN 233, TIME 235, OP 237, and ROW 239 for mnemonic reasons.

The SCN 233 column holds the System Change Number of the commit for the transaction on the OLTP database 113 that gave rise to the change data. A system change number is a monotonically increasing number that identifies every operation performed on a database system, e.g. update, insert, delete, and commit, that can be used to order the operations performed in the database system. The present invention is not limited to any particular implementation of system change numbers, and the concepts disclosed herein may be profitably employed with timestamps, incrementing serial numbers, and the like.

The TIME 235 column contains the commit time of the transaction that gave rise to the change data. This columns helps subscriber applications 121 select or view change data that occurs in particular periods of time.

The OP 237 column contains a code indicating the type of operation that resulted in the change data. For example, if the OP 237 column contains the symbol 'I', then the operation was an insert operation and the change data in the source table columns 231 contains the data that was inserted. If the OP 237 column contains the symbol 'D', then the operation was a delete operation and the change data in the source table columns 231 contains the data that was deleted (this allows the summaries to be properly readjusted by the subscriber applications 121). If the OP 237 column contains the symbol 'UO', then the operation was an update operation and the change data in the source table columns 231 contains the old data that was modified; likewise, if the OP 237 column contains the symbol 'UN', then the operation was an update operation and the change data in the source table columns 231 contains the new data that was modified. Thus, update operations on the source table result in two entries in the change table, one for the old data and another for the new data, so the subscriber applications 121 have sufficient information to readjust their summaries of the OLTP data. Under certain circumstances, the source table may include "large objects" (LOB) such as graphics and pictures. This LOB is typically not summarized, so, to save memory, only the new LOB is recorded in the change table (with the symbol 'UL' in the OP 237 column). These symbols in the OP 237 column ('I', 'D', 'UO', 'UN', 'UL') are chosen for mnemonic reasons and other symbols can be arbitrarily assigned any unique value without departing from the purview of the present invention (e.g. numbers).

The ROW 239 column contains a unique row sequence number for the changes in the change table. This column helps subscriber applications 121 order the operations that have been committed in the same transaction. Also, both the record for the old updated values (OP 237 column with 'UO') and the record for the new updated values (OP 237 column with 'UN') of the same operation will have the same row sequence number, because these two records are for the same change operation on the OLTP database 113 (an update operation).

Although not depicted in FIG. 2, additional control columns may be provided to facilitate the implementation of embodiments of the present invention. For example, a bit mask of the updated columns can be used to identify quickly which columns have changed. As another example, the name of a user who causes the operation can be recorded in a control column. The row identifier of the affected row in the source table can also be included in a control column.

The subscriber applications 121, 123 of FIG. 1, however, need not see all the contents of the change tables. In particular, the range of rows that the subscriber applications 121, 123 see in the respective subscriber views is restricted and carefully controlled, as explained in detail below, so that change data is not lost nor double counted for subscriber applications 121, 123. In the example of FIG. 2, two subscriber views 241, 243 are depicted although any number of subscriber views may be created during the operation of an embodiment of the present invention. Use of the subscriber views 241, 243 beneficially insulates the respective subscriber applications 121, 123 from the implementation details of the change table 225. Unlike some prior art approaches, it is not necessary to add any control columns or information to the source tables themselves on the OLTP database 113; the provision of control columns for the change tables on the analysis database 125 suffices. Consequently, this feature allows change data capture to be performed without changing the schema of the OLTP database 113, which is desirable for many turn-key OLTP databases.

ASYNCHRONOUS CHANGE DATA CAPTURE

Figure 3:
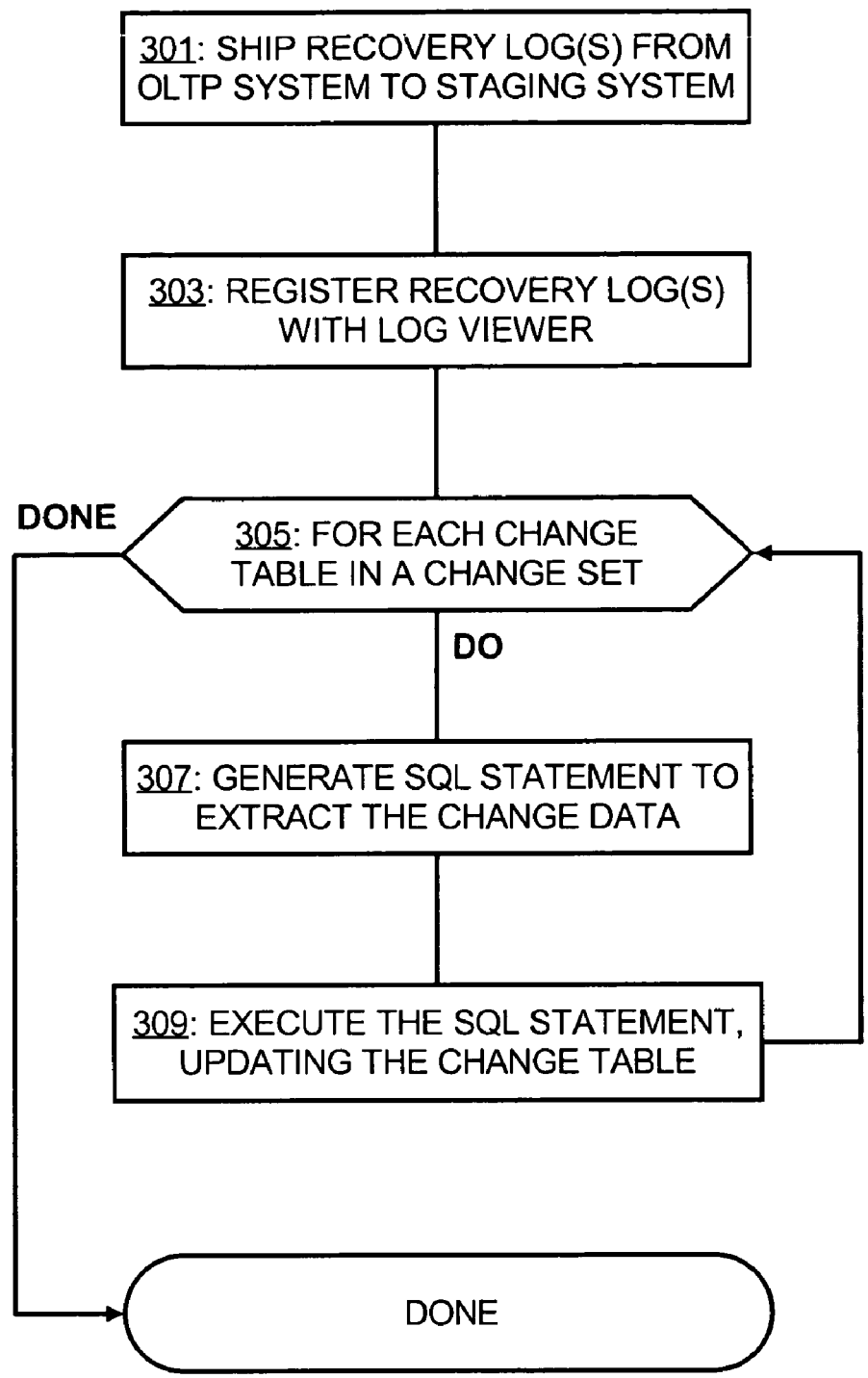
FIG. 3 is a flowchart that illustrates asynchronous change data capture for an embodiment of the present invention.

Referring to FIG. 3, at step 301, the recovery logs 117 are shipped from the source system 110 to a location on the staging system 120 called a change source 131, which can be an operating system directory. Also known as a "redo log," a recovery log 117 is produced by the OLTP database system 113 in the normal course of operation to allow users to undo transactions (e.g. in a transaction rollback) and to provide for recovery after a system crash. Recovery logs 117 thus provide a way to cancel or to abort a transaction before the transaction is committed, and recovery logs 117 are a standard feature of relational database management systems. One way to implement the log shipper 119 is described in the commonly assigned, co-pending U.S. patent application Ser. No. 09/852,008 entitled "Disaster Recovery with Bounded Data Loss" filed on May 10, 2001 by Mahesh Girkar et al., the contents of which are hereby incorporated by reference.

Some database management systems provide a log viewer 129 to allow the user to extract data from recovery logs 117 for auditing or reporting. When used for this purpose, the recovery logs 117 constitute an audit trail of the changes that have been previously made to the OLTP database 113. In accordance with one embodiment of the invention, the shipped recovery logs 117 in the change source 131 are registered with the log viewer 129 to permit information to be extracted from the shipped recovery logs 117, not just for purposes of auditing as previously used but for change data capture. Use of a log viewer 129 advantageously encapsulates, hides, and insulates the implementation details of the recovery logs 117 from the publisher 127, thereby simplifying the design and maintenance of the publisher 127. Furthermore, the log viewer 129 permits the publisher 127 to extract data from recovery logs 117 that have been produced by a foreign database system, which has been developed by a different database vendor and employs a different, incompatible implementation of the internal data structures, file formats, and algorithms.

Preferably, the log viewer 129 is configured to provide a relational database interface to the data in the recovery logs 117 so that the publisher 127 can obtain the change data by executing a SQL select statement. For the purpose of the following discussion, the relational database interface is mediated through a relational view on the recovery logs 117 called VIEWER, which contains at least the following columns: TABLE_VIEWED, which contains the name of the source table from which change data is to be extracted, and SCN, which contains the system change number of each of the transactions in the recovery logs 117. A system change number is a monotonically increasing number used to unique identify operations performed on the OLTP database 113. Furthermore, a SQL function, EXTRACT( ), is provided to extract data from a particular column from the recovery log 117. The EXTRACT( ) is passed the name of the column whose data is to be returned.

At step 305, each change table is processed in a change set, which is a logical group of related change tables that are to be kept transactionally consistent. Accordingly, a transaction to update the change tables is begun for all the change tables in the change set and is committed at the end of this process to ensure that all the changes to related change tables will become visible to the subscriber applications 121, 123 at the same time.

At step 307, a structured query language (SQL) statement is generated to fetch the change data via the relational database interface provided by the log viewer 129 and insert the change data into a corresponding change table. In one implementation the generated SQL statement has the following form:

INSERT INTO ct (change_columns)
        SELECT source_columns FROM VIEWER
        WHERE TABLE_VIEWED=st AND SCN>ft AND SCN<=lt In this SQL statement, "VIEWER" is the name of the relational view that the log viewer 129 presents to the publisher as a relational interface; "TABLE_VIEWED" is a column that indicates which source table on the OLTP database 113 that has change data; and "SCN" is a column that identifies the transaction that resulted in the change data. The remaining slots of the SQL statement, set in italics, are explained with respect to a working example as follows.

The slot "ct" is the name of the current change table being processed in the loop controlled by step 305, and the slot "st" is the name of the corresponding source table. In the working example, if staging system 120 is configured to maintain a change table that corresponds to a source table in the OLTP database 113 called, the name of the corresponding change table may be SYSTEM.CT_EMP. In this example, the slot "ct" is filled with "SYSTEM.CT_EMP" and the slot "st" is filled with "SCOTT.EMP".

The slot "source_columns" is a list of the columns in the change table. In this example, if the SCOTT.EMP source table contains source columns EMPNO, ENAME, HIREDATE, and DEPTNO, then the "source_columns" slot would be filled with "EMPNO, ENAME, HIREDATE, DEPTNO". The string for this list may be built by iterating over the information stored in system metadata 230.

The slot "change_columns" is a list of the columns in the change table and their corresponding source table columns with remaining as appropriate, with the general form "EXTRACT(sc) AS cc" where "sc" is the name of the source table column and the "cc" is the name of the change table column. In this example, if the change table columns are given the same names as the corresponding columns in the source table, then the "change_columns" slot would be filled with "EXTRACT (EMPNO) AS EMPNO, EXTRACT (ENAME) AS ENAME, EXTRACT(HIREDATE) AS HIREDATE, EXTRACT(DEPTNO) AS DEPTNO". The string for this list may be built by iterating over the columns in the change table, a list of which may be stored and obtained from system metadata 230.

The slot "ft" holds the transaction identifier of the first change record for the current change table, in which the transaction identifier is either a unique, monotonically increasing transaction number or a system change number. Similarly, the slot "lt" is the transaction identifier of the last change record for the current change table. In this example, the "ft" slot may have a value of 1001 for the first transaction, and the "lt" slot may have a value of 9009 for the last transaction.

The generated SQL statement, filling the slots with the data in accordance with this example, would be:

INSERT INTO SYSTEM.CT (EMPNO, ENAME, HIREDATE, DEPTNO)
        SELECT EXTRACT (EMPNO) AS EMPNO,
            EXTRACT (ENAME) AS ENAME,
            EXTRACT (HIREDATE) AS HIREDATE,
            EXTRACT (DEPTNO) AS DEPTNO
        FROM VIEWER
        WHERE TABLE_VIEWED=SCOTT.EMP AND SCN>1001 AND SCN<=9009

At step 309, the generated SQL statement is executed, thereby fetching the change data from the shipped recovery logs 117 via the log viewer 129 and update the corresponding change tables. The SQL "INSERT . . . SELECT" statement can be optimized by the analysis database 125 when its native language is SQL. As a result, the analysis database 125 is able to take advantage of the indexing, partitioning, and parallel features of the analysis database 125. Furthermore, use of standard SQL for this operation benefits from the data integrity and transactional capability that is the hallmark of a modern relational database management system. For example, a plurality of the SQL "INSERT . . . SELECT" statements can be made part of a single transaction per change set, so that the entire data loading operation executes as a single transaction. This approach addresses data integrity or recovery problems that characterize the conventional flat file approach that would arrive, for example, if columns EMPNO, ENAME, and HIREDATE successfully loaded, but column DEPTNO contained an error, impacting transactional consistency.

HARDWARE OVERVIEW

Figure 4:
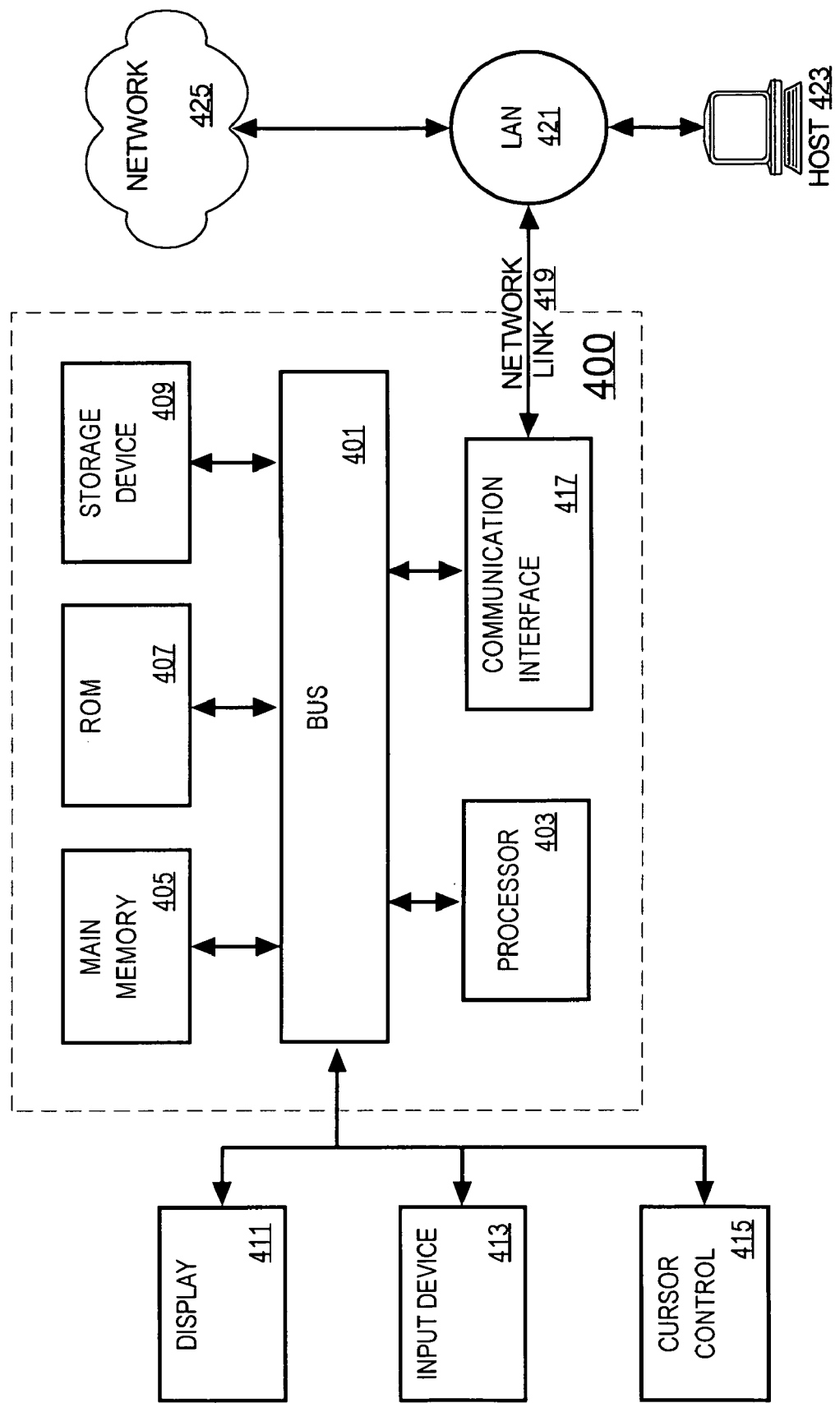
FIG. 4 depicts a computer system that can be used to implement an embodiment of the present invention.

FIG. 4 illustrates a computer system 400 upon which an embodiment according to the present invention can be implemented. The computer system 400 includes a bus 401 or other communication mechanism for communicating information, and a processor 403 coupled to the bus 401 for processing information. The computer system 400 also includes main memory 405, such as a random access memory (RAM) or other dynamic storage device, coupled to the bus 401 for storing information and instructions to be executed by the processor 403. Main memory 405 can also be used for storing temporary variables or other intermediate information during execution of instructions to be executed by the processor 403. The computer system 400 further includes a read only memory (ROM) 407 or other static storage device coupled to the bus 401 for storing static information and instructions for the processor 403. A storage device 409, such as a magnetic disk or optical disk, is additionally coupled to the bus 401 for storing information and instructions.

The computer system 400 may be coupled via the bus 401 to a display 411, such as a cathode ray tube (CRT), liquid crystal display, active matrix display, or plasma display, for displaying information to a computer user. An input device 413, such as a keyboard including alphanumeric and other keys, is coupled to the bus 401 for communicating information and command selections to the processor 403. Another type of user input device is cursor control 415, such as a mouse, a trackball, or cursor direction keys for communicating direction information and command selections to the processor 403 and for controlling cursor movement on the display 411.

According to one embodiment of the invention, change data capture is provided by the computer system 400 in response to the processor 403 executing an arrangement of instructions contained in main memory 405. Such instructions can be read into main memory 405 from another computer-readable medium, such as the storage device 409. Execution of the arrangement of instructions contained in main memory 405 causes the processor 403 to perform the process steps described herein. One or more processors in a multi-processing arrangement may also be employed to execute the instructions contained in main memory 405. In alternative embodiments, hard-wired circuitry may be used in place of or in combination with software instructions to implement the embodiment of the present invention. Thus, embodiments of the present invention are not limited to any specific combination of hardware circuitry and software.

The computer system 400 also includes a communication interface 417 coupled to bus 401. The communication interface 417 provides a two-way data communication coupling to a network link 419 connected to a local network 421. For example, the communication interface 417 may be a digital subscriber line (DSL) card or modem, an integrated services digital network (ISDN) card, a cable modem, or a telephone modem to provide a data communication connection to a corresponding type of telephone line. As another example, communication interface 417 may be a local area network (LAN) card (e.g. for Ethernet™ or an Asynchronous Transfer Model (ATM) network) to provide a data communication connection to a compatible LAN. Wireless links can also be implemented. In any such implementation, communication interface 417 sends and receives electrical, electromagnetic, or optical signals that carry digital data streams representing various types of information. Further, the communication interface 417 can include peripheral interface devices, such as a Universal Serial Bus (USB) interface, a PCMCIA (Personal Computer Memory Card International Association) interface, etc.

The network link 419 typically provides data communication through one or more networks to other data devices. For example, the network link 419 may provide a connection through local network 421 to a host computer 423, which has connectivity to a network 425 (e.g. a wide area network (WAN) or the global packet data communication network now commonly referred to as the "Internet") or to data equipment operated by service provider. The local network 421 and network 426 both use electrical, electromagnetic, or optical signals to convey information and instructions. The signals through the various networks and the signals on network link 419 and through communication interface 417, which communicate digital data with computer system 400, are exemplary forms of carrier waves bearing the information and instructions.

The computer system 400 can send messages and receive data, including program code, through the network(s), network link 419, and communication interface 417. In the Internet example, a server (not shown) might transmit requested code belonging to an application program for implementing an embodiment of the present invention through the network 425, local network 421 and communication interface 417. The processor 403 may execute the transmitted code while being received and/or store the code in storage device 409, or other non-volatile storage for later execution. In this manner, computer system 400 may obtain application code in the form of a carrier wave.

The term "computer-readable medium" as used herein refers to any medium that participates in providing instructions to the processor 403 for execution. Such a medium may take many forms, including but not limited to non-volatile media, volatile media, and transmission media. Non-volatile media include, for example, optical or magnetic disks, such as storage device 409. Volatile media include dynamic memory, such as main memory 405. Transmission media include coaxial cables, copper wire and fiber optics, including the wires that comprise bus 401. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on a storage device either before or after execution by processor.

CONCLUSION

While the present invention has been described in connection with a number of embodiments and implementations, the present invention is not so limited but covers various obvious modifications and equivalent arrangements, which fall within the purview of the appended claims.

What is claimed is:

1. A method for change data capture, comprising the steps of:
    executing a database statement to copy a recovery log that contains change data for all transactions performed from a source object in a first system to a database object in a second system;
    storing the recovery log that contains the change data;
    grouping a plurality of change tables in the database object of the second system into at least two groups of change tables;
    obtaining at least some of the change data from the recovery log based in part on a column in the recovery log that holds data representing when a transaction has been committed;
    inserting the at least some change data into one of the at least two groups of change tables in a single transaction, where each change table in the one of the at least two groups of change tables includes a column corresponding to the column in the recovery log; and
    renaming a column heading for a source column of the source object and providing the renamed column heading for the source column as a column heading in a change column of the database object.

2. A method according to claim 1, further comprising: generating the database statement to store the change data in the database object.

3. A method according to claim 1, further comprising the step of: shipping change data from the recovery log of an on-line transaction processing (OLTP) system to a staging system.

4. A computer-readable storage medium storing instructions for change data capture, said instructions arranged, when executed, to cause one or more processors to perform the steps of:
    executing a database statement to copy a recovery log that contains change data for all transactions performed from a source object in a first system to a object in a second system;
    storing the recovery log that contains the change data;
    grouping a plurality of change tables in the database of the second system into at least two groups of change tables;
    obtaining at least some of the change data from the recovery log based in part on a column in the recovery log that holds data representing when a transaction has been committed;
    inserting the at least some change data into one of the at least two groups of change tables a single transaction, where each change table in the one of the at least two groups of change tables includes a column corresponding to the column in the recovery log; and
    renaming a column heading for a source column of the source object and providing the renamed column heading for the source column as a column heading in a change column of the database object.

5. A method of change data capture, comprising the steps of:
    shipping change data for at least one transaction that has been performed on an on-line transaction processing (OLTP) system from a recovery log that contains change data for all transactions performed on the on-line transaction processing (OLTP) system to a staging system; and
    at the staging system, performing the steps of:
        copying the recovery log from the on-line transaction processing (OLTP) system;
        storing the recovery log in a first database object having at least one control column;
        grouping a plurality of change tables in a second database object of the staging system into at least two groups of change tables;
        obtaining change data from the recovery stored in the first object based in-part on a column in the recovery log that holds data representing when a transaction has been committed;
        inserting the change data into one of the at least two groups of change tables in the second database object, in a single transaction, each change table in the one of the at least two groups of change tables having a column corresponding to the column in the recovery log, said change data representing modifications that has been performed to a plurality of source tables of the on-line transaction processing (OLTP) system and that correspond to the change tables in the second database object; and
        renaming a column heading for a source column of the source object and providing the renamed column heading for the source column as a column heading in a change column of the database object.

6. A method of change data capture, comprising the steps of:
    shipping change data for at least one transaction that has been performed on an on-line transaction processing (OLTP) system from a recovery log that contains change data for all transactions performed the on-line transaction processing (OLTP) system to a staging system; and
    at the staging system, performing the steps of:
        registering the recovery log with a log viewer;
        generating a SQL statement to extract the change data from the recovery log; and
        executing the SQL statement, thereby copying the recovery log from the on-line transaction processing (OLTP) system;
    storing the recovery log in a first database object having at least one control column;
    grouping a plurality of change tables in a second database object of the second system into at least two groups of change tables;

obtaining change data from the recovery log stored in the first database object based in-part on a column in the recovery log that holds data representing when a transaction has been committed;

inserting the change data into one of the at least two groups of change tables in a second database object, in a single transaction, each change table in the plurality of change tables having a column correspond in to the column in the recovery log, said change data represent in modifications that has been performed to a plurality of source tables of the on-line transaction processing (OLTP) system and that corresponds to the change tables in the second database object; and renaming a column heading for a source column of the source object and providing the renamed column heading for the source column as a column heading in a change column of the database object.

7. A method according to claim 6, wherein the on-line transaction processing (OLTP) system and the staging system are provided by different database vendors employing a different, incompatible internal implementation.

* * * * *

UNITED STATES PATENT AND TRADEMARK OFFICE
CERTIFICATE OF CORRECTION

| | | |
|---|---|---|
| PATENT NO. | : 7,657,576 B1 | Page 1 of 1 |
| APPLICATION NO. | : 09/863419 | |
| DATED | : February 2, 2010 | |
| INVENTOR(S) | : William D. Norcott | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 734 days.

In column 5, line 61, delete "columns" and insert -- column --, therefor.

In column 10, line 25, delete "426" and insert -- 425 --, therefor.

In column 11, line 66, in claim 4, delete "in the" and insert -- in a --, therefor.

In column 12, line 30, in claim 5, after "recovery" insert -- log --.

In column 13, line 8, in claim 6, delete "correspond in" and insert -- corresponding --, therefor.

Signed and Sealed this

Twenty-first Day of September, 2010

David J. Kappos
*Director of the United States Patent and Trademark Office*